Nov. 27, 1956
C. S. BUSQUE
2,771,693
LAND CLEARING IMPLEMENT
Filed June 8, 1955
3 Sheets-Sheet 1
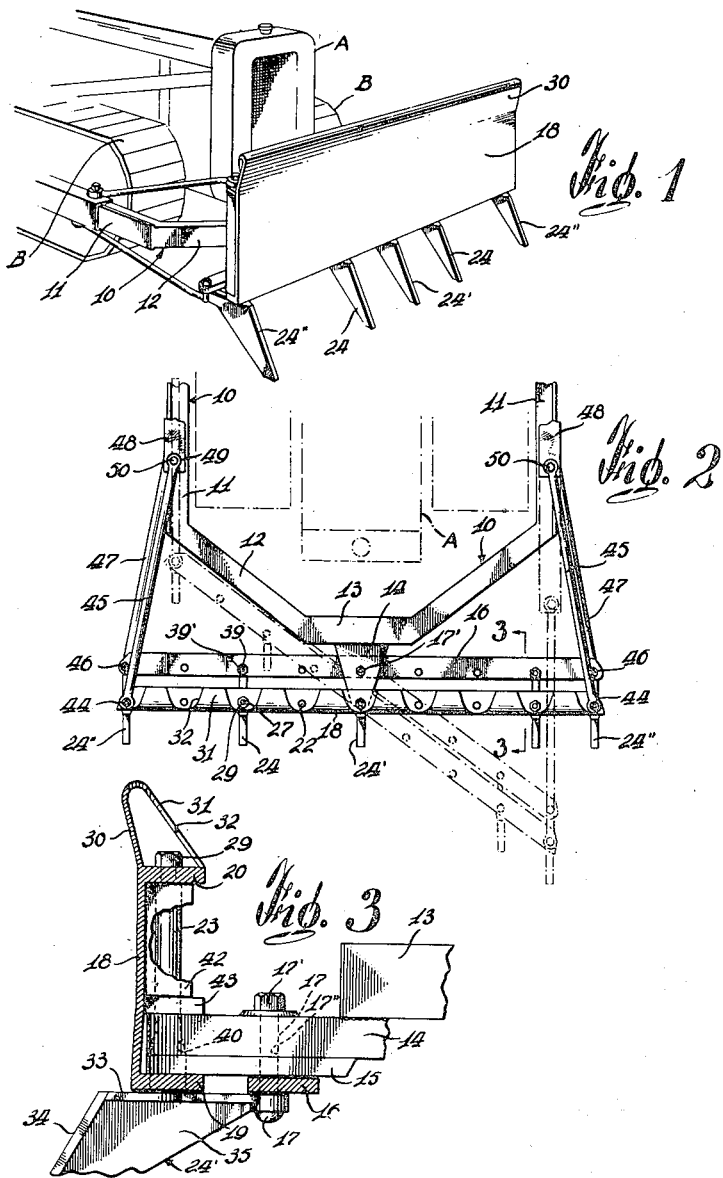
INVENTOR
Charles S. BUSQUE
BY
ATTORNEYS

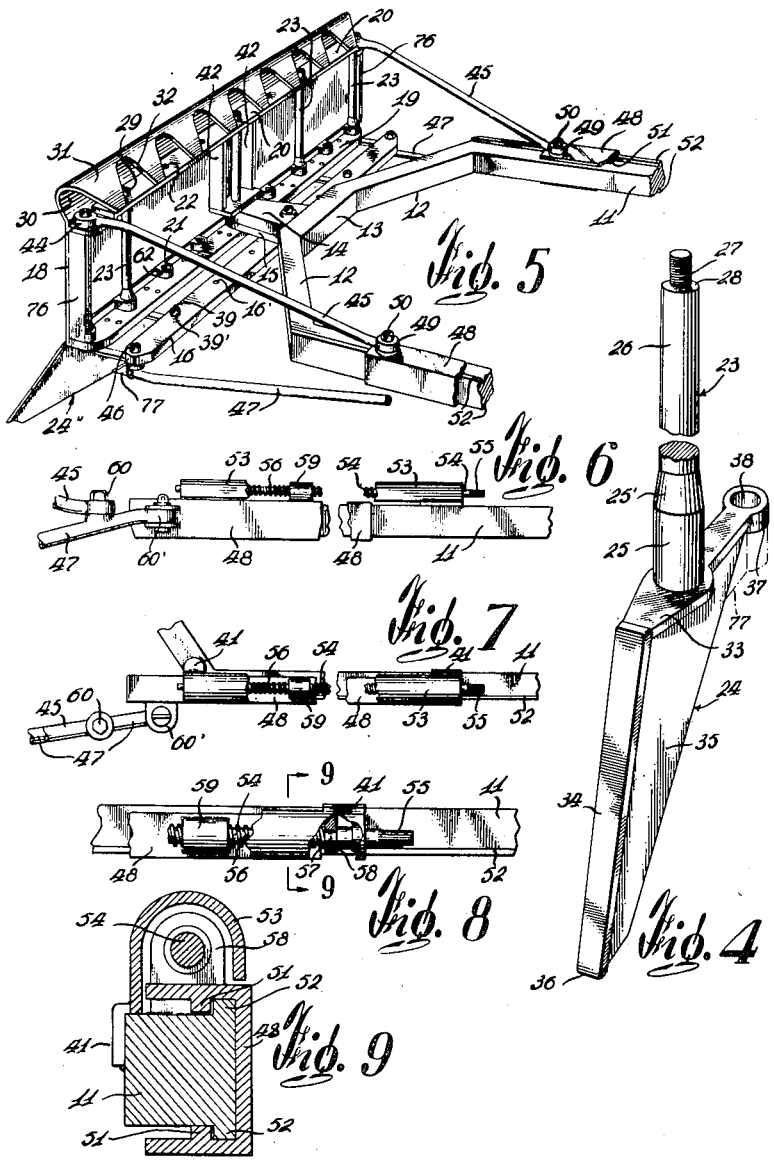

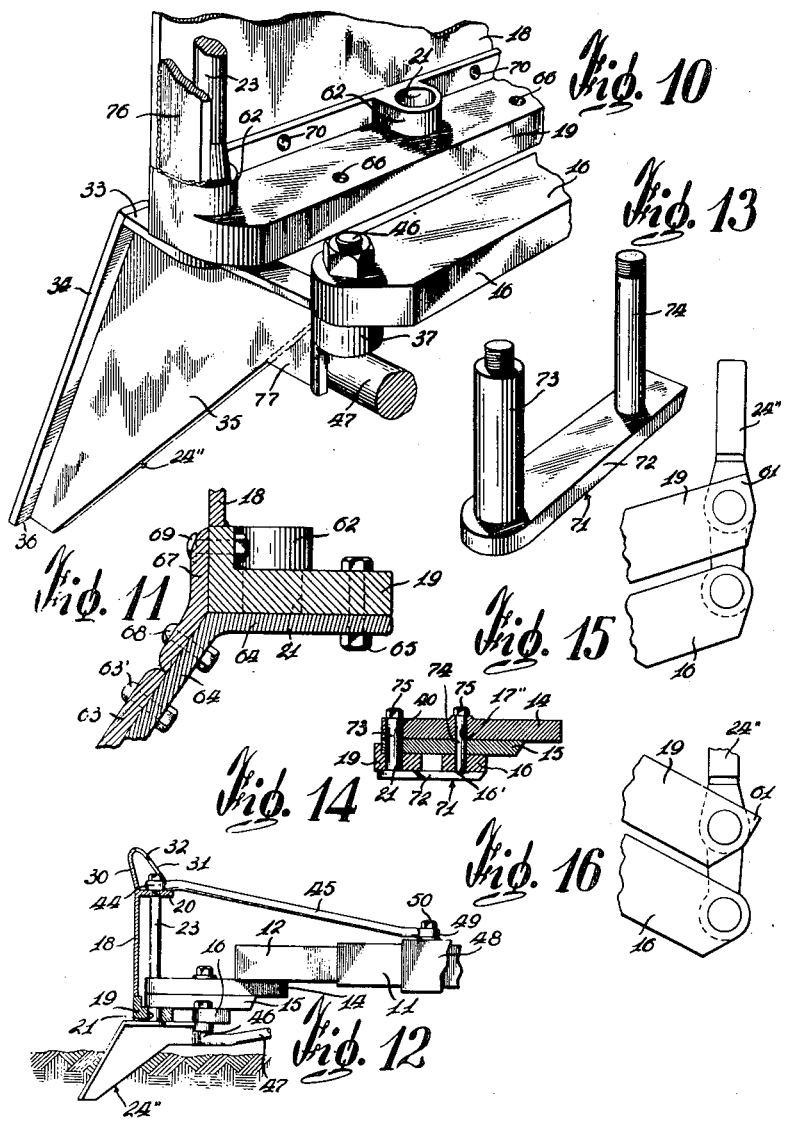

United States Patent Office 2,771,693
Patented Nov. 27, 1956

2,771,693
LAND CLEARING IMPLEMENT
Charles S. Busque, St. Gedeon de Beauce, Quebec, Canada
Application June 8, 1955, Serial No. 514,054
3 Claims. (Cl. 37—2)

The present invention relates to tractor attachments and more particularly to an implement for clearing land of stumps, boulders, trash and young growth and the like.

The general object of the present invention is the provision of a land clearing implement for attachment to a tractor, said implement being provided with a plurality of teeth which are engageable with the ground, said implement being rotatable about a vertical axis to take a position substantially perpendicular to the direction of travel of the tractor or to take an inclined position on either side thereof in order to either push the cleared debris in front of the tractor or to discharge the same alongside the tractor as the latter moves along.

An important object of the present invention is the provision of a land clearing implement of the character described which will cause a minimum of damage to the ground being cleared due to the fact that only the teeth engage the ground while the pusher plate, which pushes the debris cleared by said teeth, is disposed above ground level.

Another important object of the present invention is the provision of an implement of the character described in which the ground engaging teeth are easily detachable from the implement for replacement of broken teeth or for changing the spacing between the various teeth, the change of teeth being effected without having to disassemble any other part of the implement.

Still another important object of the present invention is the provision of an implement of the character described in which the ground engaging teeth may be easily removed and replaced by another type of implement such as an earth moving blade, a sub-soiler, a ditcher and the like.

Yet another important object of the present invention is the provision of improved means to positively rotate the implement about its vertical axis so that the same may take an inclined angular position on either side of the tractor.

Another important object of the present invention is the provision of an implement of the character described in which the ground engaging teeth are interchangeable.

Yet another object of the present invention is the provision of an implement of the character described which is relatively simple but sturdy of construction.

The foregoing and other important objects of the present invention will become more apparent during the following disclosure and by referring to the drawings in which:

Figure 1 is a perspective view of the front part of a tractor to which the implement of the present invention is attached;

Figure 2 is a plan view of the same implement;

Figure 3 is a cross-section along line 3—3 of Figure 2;

Figure 4 is a perspective view of a ground engaging tooth;

Figure 5 is a rear perspective view of the implement;

Figure 6 is a partial side elevation of the side bars showing a modification of the means to rotate the pusher plate and ground engaging teeth about the center vertical axis of the implement;

Figure 7 is a plan view of the device shown in Figure 6;

Figure 8 is an enlarged plan view, partially broken away, of the means of Figures 6 and 7;

Figure 9 is a cross-section along line 9—9 of Figure 8;

Figure 10 is an enlarged partial perspective rear view of an end ground engaging tooth;

Figure 11 is a cross-section of the pusher plate to which is attached an earth moving blade which replaces the ground engaging teeth;

Figure 12 is a cross-section taken near one end of the pusher plate;

Figure 13 is a perspective view of a device serving as pivots for the pusher plate and transverse bar, and which is secured to the central portion of the center blade when the earth moving blade is used;

Figure 14 is a cross-section of the center of the pusher blade and main frame assembly showing the device of Figure 13 in position;

Figure 15 is a diagrammatic plan view of an end tooth with associated pivoted bar and pusher plate shown in one angular position; and Figure 16 is a diagrammatic plan view similar to that of Figure 15 showing the said elements in another angular position.

Referring now more particularly to the drawings in which like reference characters indicate like elements throughout, a rigid frame 10, having generally a U-shape when viewed in plan, is pivotally secured for vertical movement to a tractor generally indicated by the reference letter A, said tractor having endless tracks B. The frame 10 is preferably secured to the sides of the tractor at the rear end thereof and suitable power means, not shown, are provided to move the frame up or down. The frame 10 consists more particularly of two straight side legs 11 of rectangular cross-section which are joined together by a cross leg made of two equally inclined portions 12 joined by a central transverse portion 13 which extends substantially at right angles to the longitudinal axis of the tractor A and in front of the same. The inclined portions 12 make an angle of substantially 37° with a plane perpendicular to the longitudinal axis of the tractor A.

As shown in Figures 2 and 5, a horizontal forwardly projecting extension 14 is rigidly secured to the transverse middle portion 13 of the frame 10. Said extension 14 has substantially a triangular shape and is reinforced by a member 15 extending underneath said extension 14, as clearly shown in Figures 3 and 5. A rigid cross bar 16 is pivotally connected at its middle portion to the extension 14 adjacent the transverse middle portion 13 of the frame 10 by means of a bolt 17 and nut 17'. The transverse bar 16 extends underneath the extension 14 and member 15.

A longitudinally straight pusher plate 18 having a substantially straight cross-section is provided with rearwardly extending integral bottom and top flanges 19 and 20 respectively. The flanges 19 and 20 extend along the entire length of the pusher plate 19 and are provided with a plurality of equally spaced bores 21 and 22 which are disposed in vertically aligned pairs. Furthermore the bores 21 of the bottom flange 19 have a larger diameter than the bores 22 of the top flange 20.

Each pair of bores 21 and 22 are adapted to receive in rotatable engagement the spindle 23 of a ground engaging tooth 24. The spindle 23 has a portion 25 of large diameter adjacent the tooth 24 engageable with the bore 21 of the bottom flange 19, said portion 25 being followed by a tapered portion 25' and a main portion 26 of smaller diameter which is itself provided at its top end with a threaded portion which has a smaller diameter than the main portion 26 to form a shoulder 28. The threaded portion 27 is adapted to extend through the bore 22 of the top flange 20, while the shoulder 28 is adapted to abut against the bottom face of said top flange 20. A nut 29 is adapted to engage the threaded portion 27 which projects above the top flange 20.

In order to protect the nut 29 against damage by rocks and other debris while the implement is in use, the pusher plate 18 is provided with an upwardly and forwardly extending part 30 which is bent downwardly and rearwardly at its top edge to provide a rear reinforcing portion 31 which is secured to the back edge of the top flange 20. The rear reinforcing portion 31 is provided with apertures 32 opposite each bore 22 of the top flange 20 to provide access to the nuts 29.

The teeth 24 are rigid with their respective spindle 23 and each consists in a top part 33 extending at right angles to the spindle 23 and to the forward end of which is secured the top end of a downwardly and forwardly extending front bar 34. The part 33 and front bar 34 are interconnected by means of a triangularly-shaped reinforcing web 35 which terminates short of the bottom end 36 of the front bar 34 and also short of the rear end 37 of the part 33. Said rear end 37 is rounded and is apertured to form a bore 38 adapted to be pivotally connected to the rear transverse bar 16 by means of a bolt 39 and nut 39'. The spindle 23 of the center ground engaging tooth 24' serves also to pivotally connect the pusher plate 18 to the forward portion of the extension 14. The spindle 23 of said center tooth 24' extends through a bore 40 made in the forwardmost portion of the extension 14 and having a tapered cross-section so as to engage the tapered portion 25' of the spindle 23, as shown in Figure 3.

In order to further reinforce the pivotal connection of the pusher plate 18 to the extension 14, reinforcing webs 42 are secured to the back face of the pusher plate 18 on both sides of the spindle 23 of the center tooth 24', as shown in Figures 3 and 5. Furthermore, an additional flange 43 is secured to the bottom edges of the webs 42 and has an aperture for the passage of the spindle 23 of said center tooth 24'. Said additional flange 43 is in frictional contact with the top face of the extension 14, as shown in Figure 3.

The bolt 17 and nut 17' which pivotally connects the transverse bar 16 to the extension 14, serves also to connect the rear end portions 37 of the center tooth 24' to said bar 16.

The threaded restricted portion 27 of the end teeth 24" is somewhat longer than the restricted portion of the remaining teeth 24 and 24' of the implement so as to pivotally connect to the pusher plate 18 the forward eye portion 44 of an upper actuating top rod 45. The bolt 46, which pivotally connects each end of the transverse bar 16 to an end tooth 24", consists of a right angle part at the forward end of the lower actuating rod 47, as shown in Figure 10.

According to the first embodiment (Figure 5) of the means for horizontally pivoting the pusher plate, the upper and lower actuating rods 45 and 47 are pivotally connected at their rear ends to the top and bottom face of a sleeve member 48 by means of eyes 49 and bolts 50. A sleeve 48 is mounted on each leg 11 of the frame 10 for slidable movement relative to the said leg. The sleeves 48 consist in a U-shaped member provided with inwardly projecting ribs 51 adapted to engage outwardly projecting flanges 52 disposed along the outside edges of the legs 11 to prevent disengagement of the sleeve 48 from said legs 11.

The sleeves 48 may be actuated for slidable movement along the legs 11 by suitable hydraulic power means (not shown) according to the first embodiment, or by a worm system according to the second embodiment (Figures 6 to 9 inclusive).

In the second embodiment, a housing 53 is welded or otherwise rigidly secured to the legs 11 as at 41 and a shaft 54 extends within said housing 53. Said shaft 54 is provided with a splined end 55 projecting from the housing 53 and adapted to be drivingly connected to suitable power means (not shown) and is provided with a worm section 56 which extends within the housing 53. The shaft 54 has a reduced portion 57 journalled in a plate 58 which is rigidly secured to the leg 11 as by welding as clearly shown at 58' in Figure 9. The plate 58 prevents longitudinal displacement of the shaft 54 relative to the leg 11. The worm section 56 of the shaft 54 is in threaded engagement with a collar 59 rigidly secured to the sleeve 48. Thus rotation of the shaft 54 will positively displace the sleeve 48 with respect to the leg 11 and consequently rotate the pusher plate 18 about the pivotal vertical axis of said plate which is defined by the spindle 23 of the centre tooth 24'. The upper actuating rod 45 is directly pivotally mounted on the lower actuating rod 47, as shown at 60 in Figures 6 and 7, while the lower actuating rod 47 is pivotally connected at 60' to the side of sleeve 48.

From the foregoing, it will be noted that the pusher plate 18, teeth 24, 24' and 24" and the transverse bar 16 together with the extension 14 form deformable parallelogram arrangements which are pivotally mounted on the frame 10 for horizontal movement such that said parallelograms may take a position extending transversely of the tractor as shown in full lines in Figure 2, or extending at an angle relative to said tractor, as shown in dot and dash lines in Figure 2, the teeth remaining at all times in planes parallel to the longitudinal axis of the tractor, that is pointed forwardly.

It will be noted that the pusher plate 18 may take angular positions on either side of the tractor, and in the limit angular positions of the arrangement the transverse bar 16 will be parallel to and extend underneath either one of the inclined portions 12 of the frame 10. In said angular limit positions, the pusher plate will make an angle of substantially 37° with the longitudinal axis of the tractor for efficient discharge of the debris collected by the pusher plate, over the side of the tractor.

As shown in Figures 15 and 16 the ends of the bottom flange 19 of the pusher plate 18 form an acute angle 61 at the forward corner thereof so that said angular portion 61 will project outwardly from the end tooth 24" in order to project the pivotal connection of said end tooth 24" with the rear transverse bar 16 against damage from the debris being discharged by the pusher plate to the side of the tractor.

In order to reinforce the pivotal connections of the teeth to the pusher plate 18, there are provided reinforcing collars 62 which form longer journals for the spindles 23 such that there will be a rotatable contact between the whole length of the portion 25 of said spindle 23 with the bores 21 of the bottom flange 19 of the pusher plate 18.

The implement, according to the present invention, may be adopted to be used as an earth moving blade by simply removing the teeth 24, 24' and 24" and by attaching to the bottom flange 19 of the pusher plate 18 a ground engaging plate 63, as shown in Figure 11. More particularly, the blade 63 is secured by bolts 63' to an angular attachment plate 64 adapted to contact the bottom face of the bottom flange 19 and be secured thereto by means of bolts and nuts 65 engageable with holes 66 made in the bottom flange 19. The connection of the blade 63 to the pusher plate 18 is further reinforced by means of a second angular plate 67 secured to the first angular plate 64 by means of bolts 68, and to the pusher plate 18 by means of bolts 69 which pass through holes 70. When the pusher plate 18 is used in conjunction with an earth moving blade 63, the teeth 24 being entirely removed, the element shown in Figure 13 at 71 is used to provide the pivotal connections of the pusher plate 18 and transverse bar 16 on the extension 14 of the frame 10. The element 71 consists of a bar 72 on which are rigidly secured two spaced parallel spindles 73 and 74, adapted to pass through the centre bores 21 and 16' of the flange 19 and transverse bar 16 and through the forward and rear bores 40 and 17" of the extension 14 respectively. The upper end of the spindles 73 and 74 are threaded to receive nuts 75.

In order to provide further protection against damage to the spindle of the end teeth 24", protecting plates 76 are secured to the end edges of the pusher plate 18 and extend in spaced parallel relationship with the end spindles 23. The protecting plates 76 are secured at their lower end to the reinforcing collars 62 of the end teeth 24" and at their upper ends to the top flange 20 of the pusher plate 18.

Half collars 77 are secured to the web 35 of the end teeth 24" and contact the bolt part 46 of the lower actuating rods 47 to protect said rods 47 against damage.

From the foregoing description, it will be seen that it is an easy matter to replace the ground engaging teeth 24. Only two nuts need to be unscrewed for each tooth and the teeth are then free to be removed without having to disassemble any other part of the implement. Also it will be noted that all the intermediate teeth 24 are interchangeable and their spacing may be varied to suit the particular conditions of use.

Similarly, due to the fact that the ground engaging teeth 24 are easy to remove and replace, the land clearing implement may be easily converted into another kind of farm implement, such as the modification shown in Figure 11 in which an earth moving blade is secured to the bottom edge of the pusher plate 18.

It will also be noted that although the implement is of relatively light weight construction, it is fully protected against damage, more particularly its pivotal connections.

From the foregoing description it will be seen that the instrument according to the present invention has the following advantages:

Due to the fact that the implement may deposit the debris at either side of the tractor, it enables the tractor to proceed forward at a continuous speed because the load is being constantly discharged sideways.

Due to the fact that only the teeth engage the ground, a minimum of damage will be caused to the latter whereby the soil will remain fit for farming purposes and also a minimum of power will be required to operate the implement.

Due to the fact that the tractor may proceed forward at constant speed it will not have to back out or turn around for every load, and land clearing may be effected at a much faster rate than with conventional land clearing implements.

The angular position of the pusher plate 18 may be varied while the implement is in operation.

With the implement, according to the present invention, it is not necessary to pile the debris in mounds, but said debris may be spread evenly on the ground facilitating subsequent farming operations.

The teeth, according to the present invention, may be easily and quickly removed when damaged or broken because only two nuts have to be unscrewed and it is not necessary to disassemble the other components of the implement.

Due to the easy removing feature of the ground engaging teeth, the implement can be converted to any other type of farm implement, such as an earth moving blade, a sub-soiler, a ditcher and the like.

Due to the fact that there are no obstructions whatsoever between the forward face of the ground engaging teeth and the adjacent portion of the pusher plate, the debris flows smoothly from the teeth to the pusher plate which in turn pushes said debris aside.

The pusher plate may be positioned at a sharp angle, namely 37°, to provide a more efficient side discharge.

The worm system shown in Figures 6 to 9 positively locks the pusher plate and teeth at any desired angle without having to exert continuous power.

While preferred embodiments according to the present invention have been illustrated and described it is understood that various modifications may be resorted to without departing from the spirit and scope of the appended claims.

I claim:

1. An implement for attachment to a tractor comprising a rigid frame mounted in front of said tractor said rigid frame consisting of two legs extending on each side of said tractor and pivotally connected to said tractor at their rear ends, and of a cross leg consisting of two inclined portions extending from the forward ends of said legs and of a transverse middle portion connecting said two inclined portions, a pusher plate provided with top and bottom longitudinally extending flanges, each flange provided with a plurality of spaced bores, the bores of said top and bottom flanges being vertically aligned in pairs and a transverse bar horizontally spaced and pivotally mounted on said transverse middle portion for horizontal movement, a plurality of ground engaging teeth having a substantially triangular shape and being in sliding contact with the bottom flange of said pusher plate, each of said teeth provided with a spindle pivotally journalled in a pair of said bores, said teeth provided with a rearward extension pivotally connected to said transverse bar, and means to pivot said pusher plate and said transverse bar from a position transversely of said tractor to a position inclined relatively thereto on either side of said tractor consisting in an upper and lower actuating rods secured to the spindle of the end teeth and to the pivotal connection of said end teeth to the rear transverse bar respectively, and in a sleeve slidably mounted on the legs of said frame and to which the rear end of said actuating rods are pivotally connected.

2. An implement as claimed in claim 1, further including means to longitudinally displace said sleeves on said legs, said means comprising a worm rotatably journalled on each leg and in threaded engagement with a collar mounted on each of said sleeves.

3. An implement as claimed in claim 1, wherein the upper end of said spindles is threaded and adapted to receive a nut, and wherein said pusher plate is further provided with a nut protecting V-shaped element surrounding said nuts and provided with recesses for access to said nuts.

References Cited in the file of this patent

UNITED STATES PATENTS

| | | |
|---|---|---|
| 449,835 | Thompson et al. | Apr. 7, 1891 |
| 722,261 | Stewart | Mar. 10, 1903 |
| 2,420,027 | Austin | May 6, 1947 |
| 2,679,701 | Busque | June 1, 1954 |